United States Patent
Boyd et al.

(10) Patent No.: US 10,107,444 B2
(45) Date of Patent: Oct. 23, 2018

(54) METHOD OF MANUFACTURING A FIELD JOINT COATING

(71) Applicant: HEEREMA MARINE CONTRACTORS NEDERLAND SE, Leiden (NL)

(72) Inventors: Helen Rose Boyd, Leiden (NL); Lara Elizabeth Wills, Leiden (NL)

(73) Assignee: HEEREMA MARINE CONTRACTORS NEDERLAND SE, Leiden (NL)

( * ) Notice: Subject to any disclaimer, the term of this patent is extended or adjusted under 35 U.S.C. 154(b) by 604 days.

(21) Appl. No.: 14/391,672

(22) PCT Filed: Apr. 12, 2013

(86) PCT No.: PCT/NL2013/050267
§ 371 (c)(1),
(2) Date: Oct. 9, 2014

(87) PCT Pub. No.: WO2013/154432
PCT Pub. Date: Oct. 17, 2013

(65) Prior Publication Data
US 2015/0101698 A1    Apr. 16, 2015

Related U.S. Application Data

(60) Provisional application No. 61/623,709, filed on Apr. 13, 2012.

(30) Foreign Application Priority Data

Apr. 13, 2012 (NL) .................................... 2008638

(51) Int. Cl.
B05D 1/08 (2006.01)
F16L 59/20 (2006.01)
F16L 58/18 (2006.01)

(52) U.S. Cl.
CPC ............... F16L 59/20 (2013.01); F16L 58/18 (2013.01); F16L 58/181 (2013.01)

(58) Field of Classification Search
CPC .......... F16L 58/18; F16L 58/181; F16L 59/20
See application file for complete search history.

(56) References Cited

U.S. PATENT DOCUMENTS

2011/0297316 A1* 12/2011 Jackson ............ B29C 45/14336
156/330

FOREIGN PATENT DOCUMENTS

WO      2010/009559 A1    1/2010
WO   WO 2012168149 A1 * 12/2012 ............. C08G 61/08
WO      2013/154432 A1    10/2013

OTHER PUBLICATIONS

European Examination Report dated Nov. 8, 2016, corresponding to application No. 13720108.3.
(Continued)

*Primary Examiner* — Dah-Wei D. Yuan
*Assistant Examiner* — Nga Leung V Law
(74) *Attorney, Agent, or Firm* — Patterson + Sheridan, L.L.P.

(57) ABSTRACT

A method of manufacturing a Field Joint Coating (FJC) for a pipeline, the method comprising: providing a pipe section to be joined to a similar pipe section or free end of a pipeline, wherein each pipe section is provided with a coating comprising a thermal insulation layer over a length of the pipe section having a protruding section, wherein the end zones of each pipe section are free of thermal insulation, thereby allowing access to the ends of the pipe section and the pipeline to connect the pipe section with the free end of the pipeline, applying an anti-corrosion coating layer on a connection region of the joined ends of the pipe section and the pipeline, heating the protruding section and applying an intermediate coating layer of a thermoplastic material on the (Continued)

anti-corrosion coating layer and the protruding section, applying a thermal insulation layer on the intermediate coating layer.

7 Claims, 9 Drawing Sheets

(56) References Cited

OTHER PUBLICATIONS

Search Report and Written Opinion dated Jun. 4, 2013 for International Application No. PCT/NL2013/050267.
Search Report and Written Opinion dated Jan. 25, 2013 for Netherland Application No. NL2008638.
Mexican Examination Report dated Jan. 30, 2017, corresponding to Application No. MX/a/2014/000099.

* cited by examiner

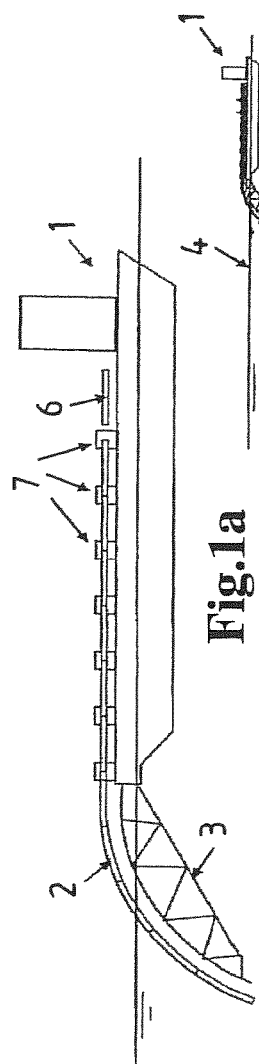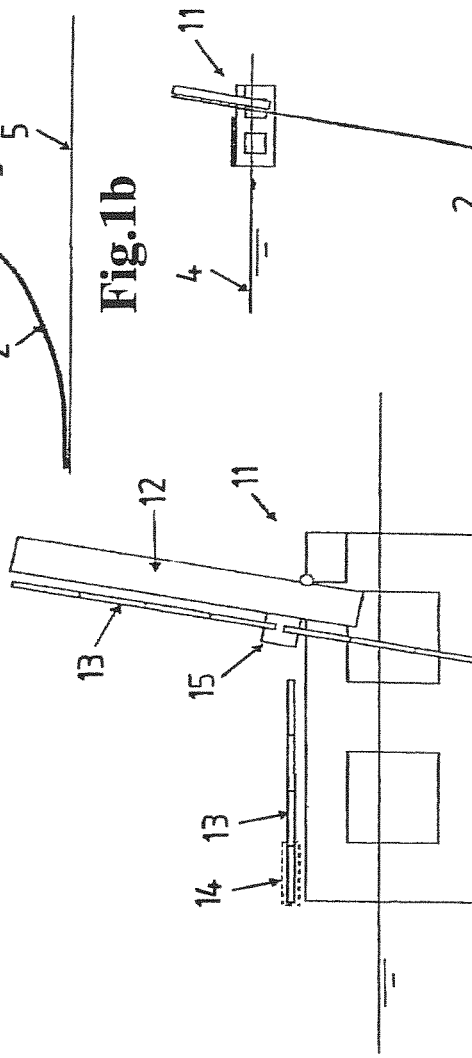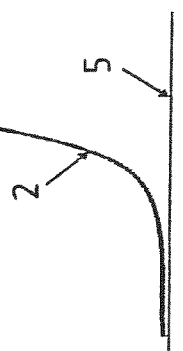

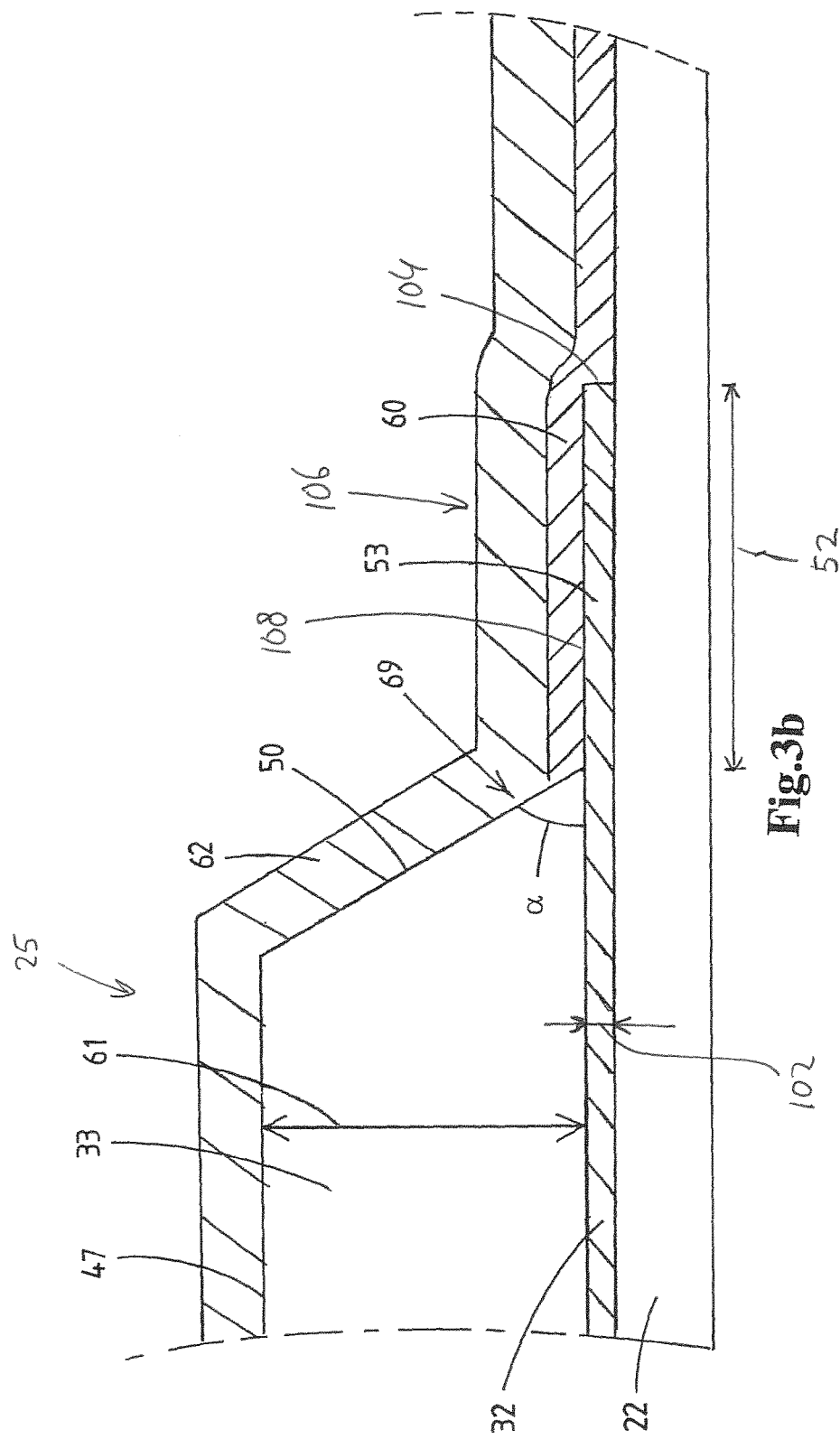

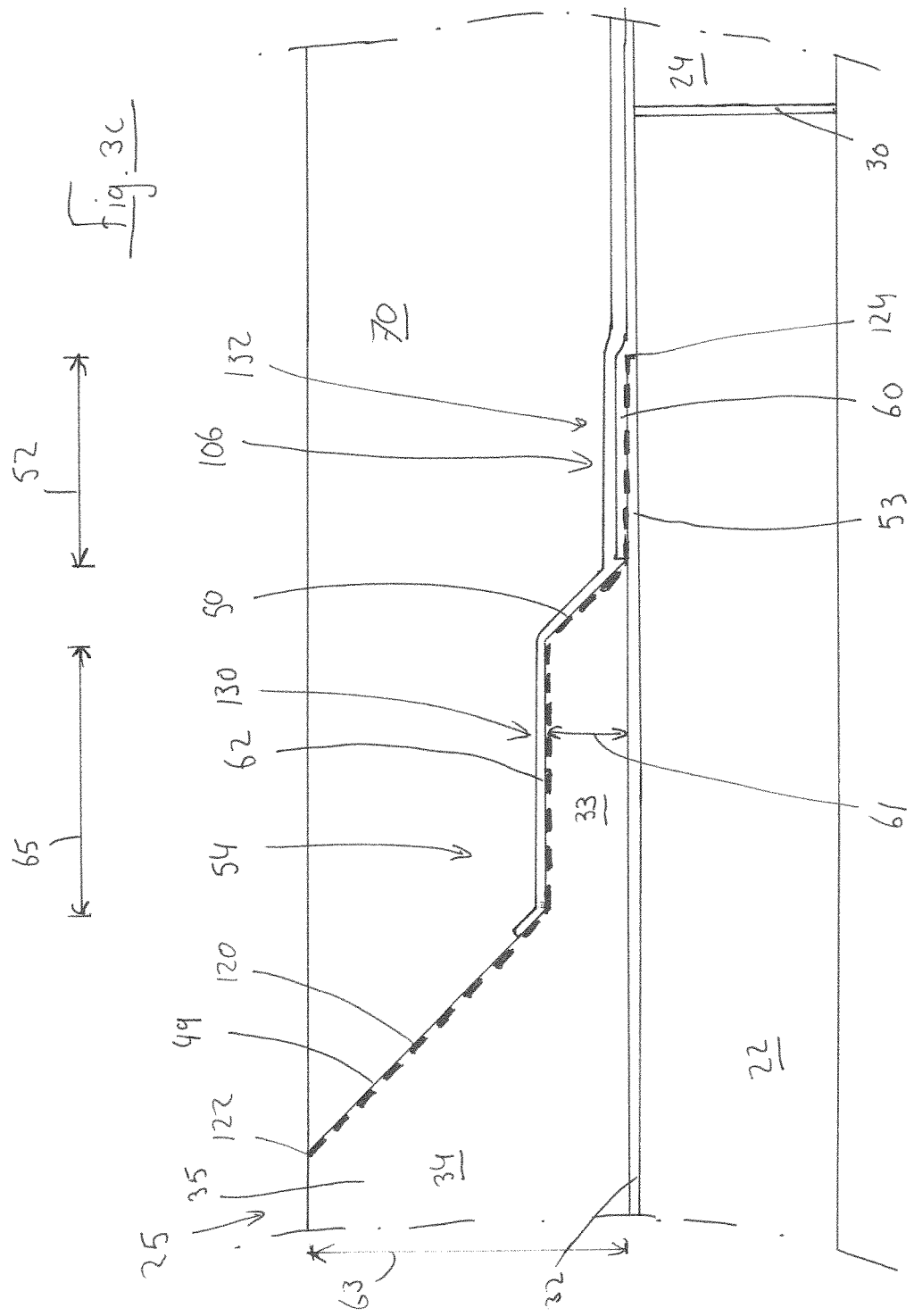

METHOD OF MANUFACTURING A FIELD JOINT COATING

This application is the National Stage of International Application No. PCT/NL2013/050267, filed Apr. 12, 2013, which claims benefit of Netherlands Patent Application No. 2008638, filed Apr. 13, 2012, and which claims benefit of U.S. Provisional Application No. 61/623,709, filed Apr. 13, 2012.

FIELD OF THE INVENTION

The present invention relates to a method and device for manufacturing a field joint coating. The present invention further relates to a pipeline comprising a joint.

DESCRIPTION OF THE PRIOR ART

Pipelines are used in the oil and gas industry for the transportation of hydrocarbons. When hydrocarbon deposits are found under the sea floor, pipelines are often laid on the sea floor for transporting the hydrocarbons to a storage or production facility.

Pipelines are typically formed from many pipe sections that are welded end-to-end before they are laid. The pipe sections are often manufactured from carbon steel and are prone to corrosion if they are not protected from the sea water. The pipe sections are therefore coated with protective material, the type of which may be determined by the operating environment. Polyolefins, such as polypropylene (PP), are widely used as a coating material. Also, other materials are used.

The outer pipe surface of the pipe section may first be provided with a layer of an anti-corrosion agent such as an epoxy, that is applied either in liquid or powdered form. Fusion Bonded Epoxy (FBE) is widely used. Subsequently, the pipe coating made from, for example, a polyolefin material is provided on the anti-corrosion layer. An adhesion promoter may be applied on top of the FBE to enhance bonding to the material of the pipe coating. Further coatings including insulation layers may be applied over these coatings.

Generally, the coating layers are applied in a well-controlled or factory environment, whereby the pipe ends of the pipe sections are not covered by the pipe coating. The factory applied pipe coating extends along a length of the pipe member and ends at a first coating end face located at a distance from the first pipe end and at a second coating end face located at a distance from the second pipe end.

To produce a pipeline, the pipe ends of the pipe sections are joined together, generally by welding. Other joining techniques may be used. The pipe sections are joined at a pipe joint, such that the coating end faces of the pipe sections are located at opposite sides of the pipe joint.

After the joining of the pipe sections, the pipe ends and the pipe joint need to be covered by a joint coating. The joint coating should bond with the factory applied pipe coating, in order to protect the pipe during its working lifetime on the seafloor, which may be about 40 years. The pipe sections are joined together in the field before they are installed in the sea, either as risers between the seafloor and the surface, or laid on the seabed. Pipes can be installed by J-lay or S-lay or reeled onto a reel before transport to a pipelay vessel. The coating of the pipe joints is therefore performed in the field. This means that said operations may take place outside of a factory environment, such as at an onshore spool base, a quay or off-shore on the pipelay vessel, where it can be difficult to achieve optimal conditions for coating The coating of the joint is generally referred to as a Field Joint Coating in the field of the art, and abbreviated as FJC.

Pipe coatings and field joint coatings are used to protect the pipe from the seawater which can cause corrosion. They are also used to provide mechanical protection.

Pipes are used to transport fluid having a different temperature than the seawater. During the transport of hydrocarbons produced from wells with high temperatures, the elevated temperature should be maintained. Insulation is therefore needed to prevent heat transfer. Pipe coatings are also used to provide thermal insulation, and therefore are referred to as thermal insulation coatings.

If a field joint coating is not properly adhered to the pipe coating, and disbondment occurs during the lifetime of the pipe, the temperature of the hydrocarbon could drop and therefore cause waxes and or hydrates to separate out of the hydrocarbon and form on the internal walls of the pipeline. This could lead to a reduction in the working volume of the pipeline, and possibly eventual blockage of the pipe. Very good adhesion between the pipe coating and the field joint coating is therefore imperative.

Pipe coatings also need to withstand the hydrostatic pressure experienced at a water depth. Good mechanical properties are therefore also required.

Several materials are used currently in the industry for the pipe coating, and/or insulation and/or field joint coating. Materials are used for pipe coating and or insulation include polymers. More particularly, polyolefins such as polypropylene (PP) or polyethylene (PE); as well as polyurethane (PU) including glass syntactic polyurethane (GSPU). Polypropylene is preferred by some over polyurethane because it does not hydrolize. Hydrolysis can occur in polyurethane when it is in contact with water. It is accelerated in the presence of heat. The hydrolysis reactions can also be self-perpetuating, and therefore cause the coating to degradate. This is a known disadvantage of polyurethane.

Moreover, the search for hydrocarbons leads to ever deeper locations at which hydrocarbons tend to have higher temperatures. These temperatures tend to accelerate hydrolysis further, making polyurethane less suitable for future projects including high temperature hydrocarbons.

Although polypropylene is not susceptible to hydrolysis, a known disadvantage is that it is more difficult to achieve adhesion between polypropylene and other coating materials. Methods have been developed to increase adhesion to polypropylene pipe coating, but a controlled environment is preferable. As stated, field joint coatings are applied in environments that are less controlled or even exposed to the elements. A method of achieving good adhesion in spite of the environment is required.

A common technique used for the production of the joint coating is injection moulding, such as Injection Moulded Polypropylene (IMPP). The opposite coating end faces of the two joined pipeline units are usually heated, and the pipe joint is enclosed with a mould that defines a cavity between the uncoated pipe ends and the pipe joint, the two opposite coating end faces of the pipeline units and the mould. Molten polypropylene is then injected into the cavity, under pressure, where it cools and solidifies. A layer of an anti-corrosion agent such as a type of epoxy may be provided on the uncoated pipe ends and the pipe joint, as well as an adhesion promoter, before the joint coating (for example IMPP) is applied.

A disadvantage of the use of IMPP for the joint coating is that the process is time consuming, labour intensive and expensive. Pipelay operations are usually very time sensitive, due to high day rates of the employed vessels and labour. With IMPP, a relatively long time is required for the polyolefin pipe coating to sufficiently cool and cure before it can be mobilized and withstand applied stresses. A fast cure time is therefore desirable to reduce the time needed to produce the FJC.

Another disadvantage of using IMPP is that adhesion between the polypropylene FJC and pipe coating can be difficult to achieve.

WO2010/009559A1 discloses a system having Field Joint Coatings FJC's, see FIG. 10.

SUMMARY OF THE INVENTION

The present invention provides a method of manufacturing a Field Joint Coating (FJC), the method comprising:
providing a pipe section to be joined to a further pipe section or free end of a pipeline,
wherein each pipe section is provided with a coating comprising:
a thermal insulation layer which extends over a substantial portion of the length of the pipe section,
an anti-corrosion layer situated underneath the thermal insulation layer,
wherein the end zones of the pipe section are free of coating,
connecting the pipe section to the further pipe section or free end of the pipeline,
applying an anti-corrosion coating layer on a connection region of the joined ends of the pipe section and the further pipe section or pipeline,
heating at least a part of the thermal insulation layer of the pipe section and the further pipe section or pipeline on either side of the field joint and applying an intermediate coating layer of a thermoplastic material over the anti-corrosion coating layer and over end portions of the thermal insulation layers on either side of the field joint to provide a continuous intermediate coating layer in the connection region, wherein the intermediate coating layer is applied over the anti-corrosion coating layer and over end faces of the thermal insulation layers of the joined pipe sections on either side of the field joint, thereby providing a seal across the connection region,
applying a thermal insulation layer on the intermediate coating layer.

In an embodiment, the thermal insulation layer comprises a protruding section which protrudes from a main part of the thermal insulation layer, wherein the protruding section has a thickness which is smaller than a thickness of the main part, and wherein the intermediate coating layer is applied over at least a portion of an end face of the protruding section of the thermal insulation layer, and wherein in particular the protruding section of the thermal insulation layer has a length which is more than twice a thickness of the protruding section of the thermal insulation layer.

A primary function of the intermediate coating layer is to seal off the pipe from any ingress of water. Hence, the intermediate coating layer may also be referred to as a "sealing layer".

In an embodiment, the protruding section of the anti-corrosion layer protrudes over a distance from underneath the protruding section of the thermal insulation layer.

In an embodiment, the thickness of the protruding section of the thermal insulation layer is substantially uniform, and the thickness of the protruding section of the anti-corrosion layer is substantially uniform.

In an embodiment, the anti-corrosion layer has a thickness, and wherein the protruding section of the anti-corrosion layer protrudes over a distance of at least twice said thickness from underneath the thermal insulation layer.

In an embodiment, the anti-corrosion layer comprises a protruding section which protrudes from underneath the thermal insulation layer and wherein applying the anti-corrosion coating layer of the FJC comprises applying a layer of an anti-corrosion coating material onto the connection region and the protruding section of the anti-corrosion layer.

In an embodiment, applying the anti-corrosion coating layer comprises thermally spraying a layer of an anti-corrosion coating material onto the connection region.

In an embodiment, applying the anti-corrosion layer comprises thermally spraying a layer of fusion bonded epoxy (FBE) onto the connection region.

In an embodiment, pipe sections are provided having an anti-corrosion coating layer situated under the thermal insulation layer, wherein said anti-corrosion coating layer comprises protruding sections which extend beyond the ends of thermal insulation layer, and wherein the anti-corrosion coating layer of the FJC is applied over the protruding sections of the anti-corrosion coating layer of the pipe sections in order to form a closed anti-corrosion layer.

In an embodiment, the anti-corrosion coating layer of the pipe section comprises fusion bonded epoxy, and wherein the anti-corrosion layer of the FJC comprises fusion bonded epoxy, and wherein during the application of the anti-corrosion layer of the FJC, the fusion bonded epoxy of the applied anti-corrosion layer of the FJC bonds with the fusion bonded epoxy of the protruding sections in order to form a closed anti-corrosion layer.

In an embodiment, the thermoplastic material of the intermediate coating layer comprises a polyolefine, such as polyethylene or polypropylene.

In an embodiment, applying the intermediate coating layer comprises thermally spraying a layer of polyolefin such as Polypropylene (PP) onto the anti-corrosion coating layer.

In an embodiment, the intermediate coating layer is applied in a time period in which the applied anti-corrosion layer has not fully cured yet.

In an embodiment, the polyolefine material comprises 95-100% polypropylene. The remaining 0, 1-5 percent may include additives including copolymers and adhesion promoting molecules.

In an embodiment, the intermediate coating layer is applied over the anti-corrosion coating layer and over protruding end surfaces of the thermal insulation layer of the pipe section and the pipeline to which the pipe section has been connected, thereby providing a seal across the connection region.

In an embodiment of the method, an interface is defined between on the one hand layers of the pipe coating and on the other hand layers of the Field Joint Coating, and wherein said interface comprises:
a first seal in a first region of overlap between the intermediate coating layer and the thermal insulation layer, and
a second seal in a second region of overlap between the anti-corrosion layer of the FJC and the anti-corrosion layer of the pipe coating.

In an embodiment of the method, the first and second region of overlap extend substantially parallel to the pipe wall.

In an embodiment of the method, the first region of overlap has a length of at least twice a thickness of the protruding section of the thermal insulation layer, in particular at least three times said thickness, and wherein the second region of overlap has a length of at least twice a thickness of the anti-corrosion coating layer, and more in particular at least five times said thickness.

In an embodiment the protruding end surfaces of the thermal insulation layer may be between 1 and 50 mm in length.

In an embodiment the protruding section of the thermal insulation layer may be less than 6 mm in height.

In an embodiment, the intermediate coating layer is treated with a surface treatment and/or a primer prior to the application of the thermal insulation layer.

In an embodiment, the thermal insulation layer of the FJC comprises:
polyDiCycloPentaDiene (pDCPD), and/or
silicone material and/or
a modified polyether or
a polypropylene material
a polyurethane material In an embodiment, the thermal insulation layer of the FJC comprises silicone material with a polypropylene additive.

In an embodiment, the silicone material comprises 2-30 percent polypropylene by weight, based on the combination of silicone and polypropylene. The polypropylene material may be modified polypropylene. The polyurethane material may be modified polyurethane.

The PP or PU may be modified in that there may be additives included in the material to help with adhesion and/or additives to reduce hydrolysis in the case of PU.

In an embodiment, applying the thermal insulation layer of the FJC comprises injection moulding.

The present invention further relates to a pipeline comprising a series of interconnected pipe sections, each pipe section comprising a coating comprising:
a thermal insulation layer which extends over a substantial portion of the length of the pipe section,
an anti-corrosion layer situated underneath the thermal insulation layer,
wherein the pipeline comprises Field Joint Coatings (FJC) at connection regions where the ends of the adjacent pipe sections are interconnected, wherein each Field Joint Coating comprises:
an anti-corrosion coating layer,
an intermediate coating layer of a thermoplastic material which covers the anti-corrosion coating layer, wherein the intermediate coating layer extends over end faces of the thermal insulation layer of the pipe sections on either side of the Field Joint Coating, thereby forming a seal across the connection region,
a thermal insulation layer which covers the intermediate coating layer.

In an embodiment, the pipe sections between the FJC's comprise an anti-corrosion coating layer which comprises protruding sections which extend beyond the thermal insulation layer towards the ends of the pipe sections, and wherein the anti-corrosion layer of each FJC extends over the protruding sections of the anti-corrosion coating layer of the pipe sections in order to form a continuous anti-corrosion layer.

In an embodiment, the anti-corrosion layer of the pipe sections comprises a layer of epoxy, and wherein the anti-corrosion layer of the FJC's comprises a layer of epoxy, wherein the layer of fusion bonded epoxy of the pipe sections comprises protruding sections which extend beyond the thermal insulation layer of the pipe sections, the protruding sections being covered by and connected to the fusion bonded epoxy of the anti-corrosion layer of the FJC.

In an embodiment, the intermediate coating layer comprises polyolefine, such as polyethylene or polypropylene (PP).

In an embodiment, the intermediate coating layer has a thickness of 0.01 mm-10 mm.

In an embodiment, the intermediate coating layer extends over end surfaces of a thermal insulation of the pipe sections on either side of the Field Joint Coating, thereby forming a seal across the connection region.

In an embodiment, the intermediate coating layer extends at least over end surfaces of a protruding section of the thermal insulation layer of the pipe sections on either side of the Field Joint Coating.

In an embodiment, the thermal insulation layer of the Field Joint Coating comprises:
polyDiCycloPentaDiene (pDCPD), and/or
silicone, and/or
a modified polyether.

The present invention further relates to a pipe section, constructed to be connected with a further pipe section or free end of a pipeline in an end-to-end relationship, the pipe section comprising a coating comprising:
a thermal insulation layer which extends over a substantial portion of the length of the pipe section,
an anti-corrosion layer situated underneath the thermal insulation layer,
wherein opposing end zones of the pipe section are free of any anti-corrosion layer or thermal insulation layer in order to allow a welding operation at the ends of the pipe section, wherein the anti-corrosion coating layer and the thermal insulation layer stop at a distance from the ends of the pipe section, wherein the anti-corrosion coating layer comprises protruding sections which extend beyond the thermal insulation layer.

In an embodiment, the anti-corrosion coating layer comprises fusion bonded epoxy.

In an embodiment the anti-corrosion layer comprises a liquid epoxy.

In an embodiment, the thermal insulation layers are comprised of polypropylene. The present invention further relates to an assembly for providing a field joint coating (FJC) to a pipeline, the assembly comprising:
a first heating device for heating at least a part of the thermal insulation layer, in particular the protruding sections,
a first coating device for providing an anti-corrosion coating layer,
a second coating device for providing an intermediate coating layer of a thermoplastic material,
a thermal insulation depositing device for providing a thermal insulation layer.

BRIEF DESCRIPTION OF THE FIGURES

Embodiments of the invention will be described by way of example only, with reference to the accompanying schematic drawings in which corresponding reference symbols indicate corresponding parts.

FIGS. 1A, 1B, 1C and 1D show the production and installation of pipeline offshore using the S-lay and J-lay methods.

FIG. 3B shows a sectional view of a detail of FIG. 3A.

FIG. 3C shows another sectional view of a Field Joint Coating according to the invention, with a water ingress path being indicated.

DETAILED DESCRIPTION OF THE FIGURES

Figure 1E:
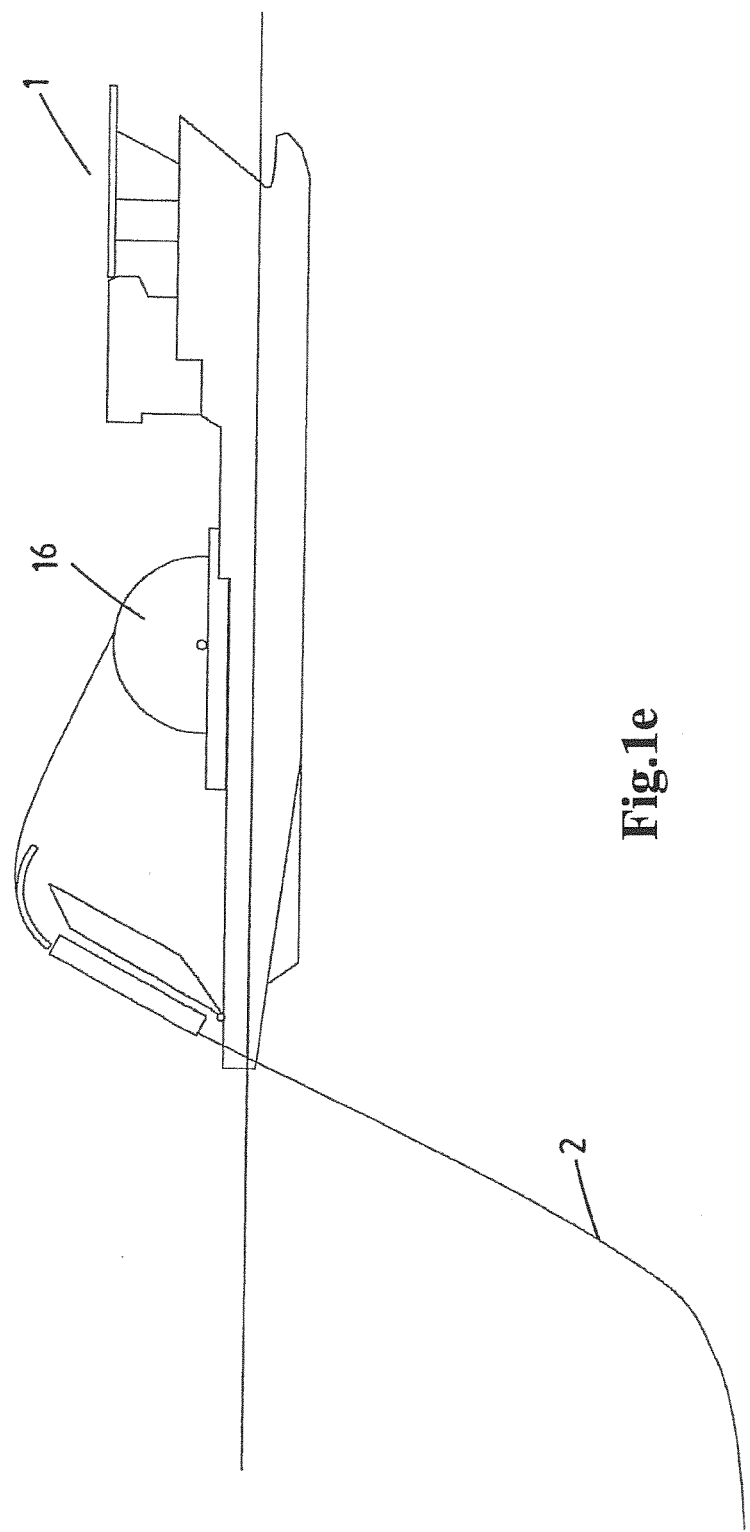
FIG. 1E shows the installation of a pipeline offshore using the reel-lay method

Turning to FIGS. 1A, 1B, 1C, 1D, offshore pipelines may be constructed in several ways. FIGS. 1A and 1B show an S-Lay vessel 1 constructing a pipeline 2 using the S-Lay method. In the S-lay method, the pipeline 2 is launched over a stinger 3 and laid in the form of an "S" between the sea surface 4 and the seabed 5. Line pipe is fabricated in typical joint lengths of 12.2 m (40 ft), sometimes 18.3 m (60 ft) length. In the S-Lay method, single pipe joints 6 are added to the most forward end of the pipeline 2, several work stations 7 performing a part of the pipeline construction process, a few stations completing the weld, one station inspecting the weld and one or two stations completing the field joint coating. As an alternative, in the S-Lay method, multiple joints, for instance double joints may be added to the end of the pipeline 2 instead of the single joint 6, the double joints being constructed from two single joints, either in a separate construction area on board the S-Lay vessel 1 or in a factory onshore.

The word pipeline may also indicate a Steel Catenary Riser (SCR).

FIGS. 1C and 1D show a J-Lay vessel 11 constructing the pipeline 2 using the J-lay method. The pipeline 2 is laid in the form of a 'J' between the sea surface 4 and the seabed 5. In the J-Lay method, multi-joint pipe sections 13 are added to the most upward end of the pipeline 2, the pipeline construction process being typically completed in one or two work stations 15. The multi-joints 13 are constructed from a number of single joints 14, either in a separate construction area on board the J-Lay vessel 11 or in a factory onshore or in a combination of both.

All pipeline construction processes have a high number of similar welds to be made either in a more or less horizontal pipe position and/or in a more or less vertical pipe position. The welds are generally referred to as field joints. The making of a field joint may be performed on the critical path of the pipeline laying operation, so time is an important factor.

FIG. 1E shows another method of pipeline laying which is generally referred to as reeling. In reeling, a relatively long length of pipe is spooled from a reel and laid on the seafloor. When the entire length is laid, a new, full reel with a new length is put in place and the pipe section on the new, full reel is connected with a weld to the trailing end of the laid pipe section.

Figure 1F:
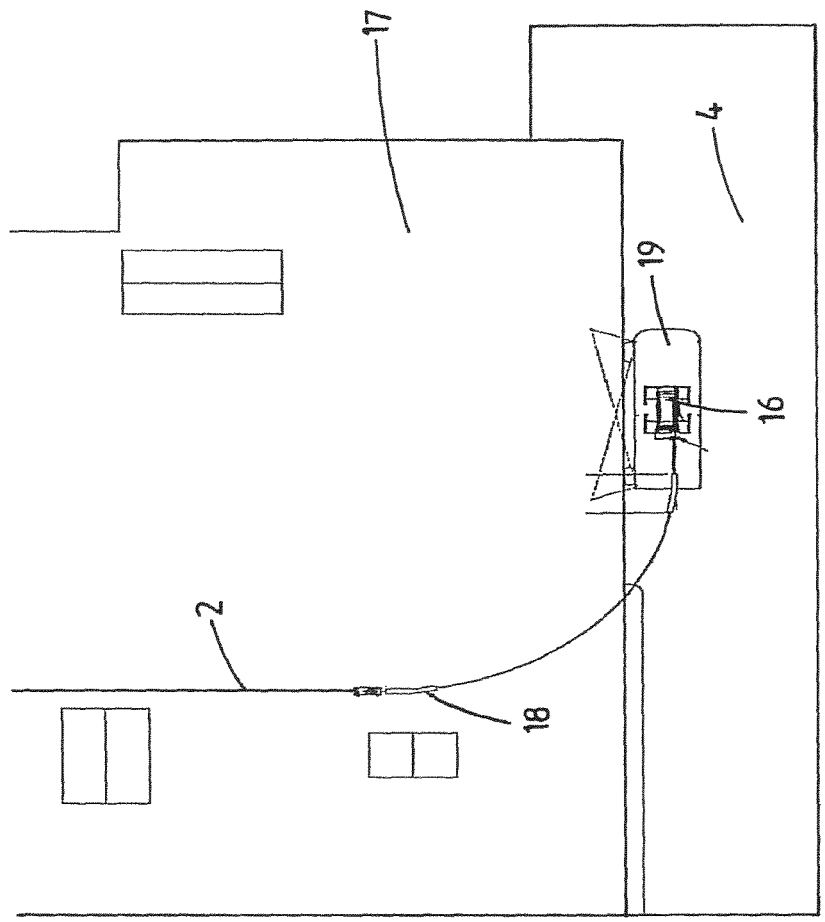
FIG. 1F shows an example of a spool base where FJC's are applied prior to spooling the pipeline on a reel.

FIG. 1F shows in top view the spooling of a pipeline 2 at a spool base 17 from land onto a reel 16 positioned on a transport barge 19 which can transport the reel to a reeling vessel. Generally, several pre-assembled lengths of pipeline, called stalks, are spooled onto a single reel. The stalks are interconnected by a field joint which is made in a work station 18 just prior to spooling the stalk onto the reel.

After the weld is made, the bare metal of the pipe at the field joint generally needs to be covered with mechanical insulation, thermal insulation and/or an anti-corrosion coating. Any combination of these protection layers which are applied after welding the field joint is generally called Field Joint Coating, i.e. the coating of the field joint. This is a separate step in the pipeline laying operation which is performed on the critical path both on the pipelay vessel 1 and on the spool base 17, as shown in FIG. 1F. A same layer may provide both mechanical protection and thermal insulation.

Figure 2:
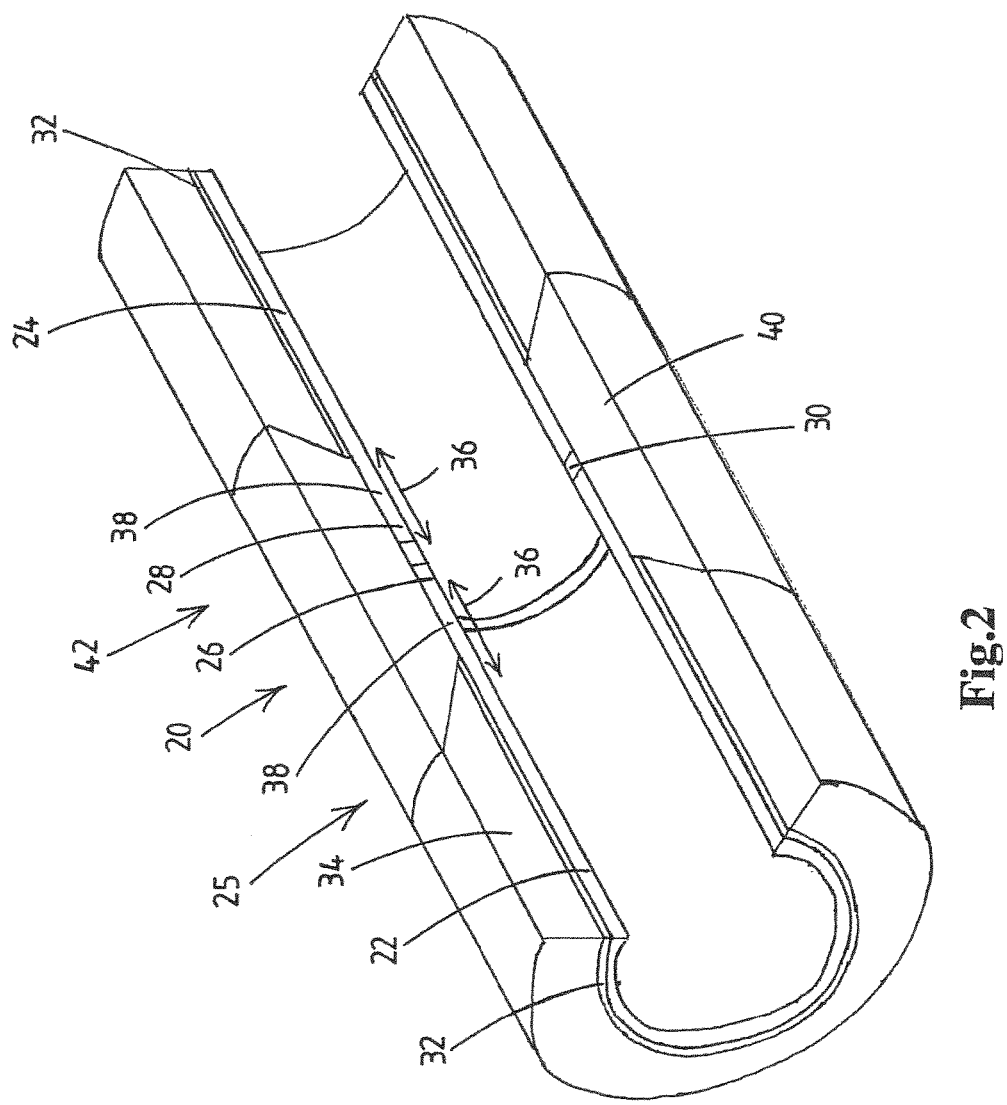
FIG. 2 shows a partial sectional view of a Field Joint Coating according to the invention.

Turning to FIG. 2, a field joint 20 according to the prior art is shown. A first pipe 22 is connected to a second pipe 24. The pipes 22, 24 are positioned in an end-to end-relationship, wherein an end 26 of the first pipe 22 abuts an end 28 of the second pipe 24. It will be clear that the pipes 22, 24 are only partially shown. The pipe 24 may form the free end of a pipeline 2 which is suspended from a pipeline laying vessel 1. The weld 30 connects the two ends of the pipes 22, 24.

Each pipe is covered with a coating 25 which comprises an anti-corrosion layer 32, which may be of fusion bonded epoxy. Other coating layers are also known. The coating 25 of each pipe further comprises a thermal insulation layer 34, which may be manufactured from a polyolefine such as polypropylene or polyethylene. The thermal insulation layer may provide thermal insulation and mechanical protection at the same time. Generally, the thermal insulation layer 34 is thicker than the anti-corrosion layer 32.

The anti-corrosion layer 32 and thermal insulation layer 34 are applied on the pipe sections 22, 24 in a controlled environment, generally on shore and prior to the transportation of the pipes to the pipeline laying vessel. This allows a fast and well controlled operation leading to a high quality.

The anti-corrosion coating layer 32 and the thermal insulation layer 34 extend over the greater portion of the pipe, i.e. 80 to 90 percent of the length of the pipe. The anti-corrosion coating layer 32 and the thermal insulation layer 34 stop at a distance 36 from the pipe ends 26, 28, so that end zones 38 are provided as bare metal. This allows for welding, inspection of the weld, and the possibility of one or more cut outs in case the weld does not meet the requirements and cannot be repaired.

In the field, the only section that needs to be coated is the area 40 around the field joint 20. This is generally called a Field Joint Coating 42.

Figure 3A:
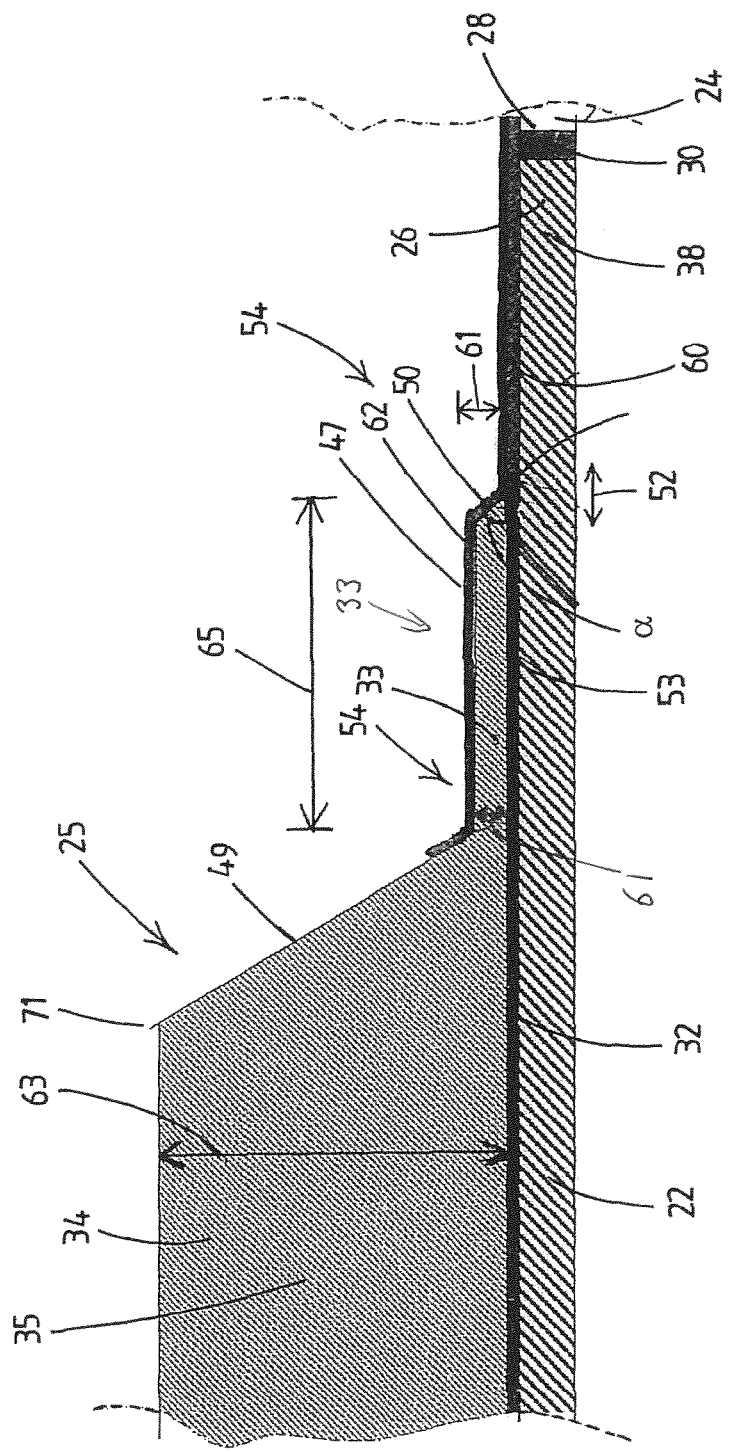
FIG. 3A shows another sectional view of a Field Joint Coating according to the invention.

Turning to FIGS. 3A and 3B, an operation of Field Joint Coating a field joint 40 according to the invention is shown. The pipe 22 is shown with the coating 25 comprising an anti-corrosion coating layer 32 and a thermal insulation layer 34. The thermal insulation layer 34 comprises an inclined end face 49 of a main part 35 of the thermal insulation layer 34, and a protruding section 33. The protruding section 33 extends over a length 65 from the end face 49 of the main part 35 of the thermal insulation layer. The length 65 of the protruding section 33 may be at least twice a thickness 61 of the protruding section 33 of the thermal insulation layer 34, in particular at least three times the thickness of the protruding section.

The anti-corrosion layer 32 may be fusion bonded epoxy, and the thermal insulation layer 34 may be polypropylene. The protruding section 33 ends in an inclined end face 50, which extends at an angle α of about 20-50 degrees to a pipe axis. The inclined end face 49 of the main part 35 is oriented in a similar angle of about 20-50 degrees to a pipe axis. The end face 49 forms the end face of a main part of the thermal insulation layer 34 and the end face 50 forms the end face of the protruding section 33 of the thermal insulation layer 34.

The end face 50 of the protruding section 33 is non-aligned with the end face 49 of the main part 35. The protruding section 33 has an outer surface 47 which may extend parallel to the pipe wall. The outer surface 47 of the protruding section is non-aligned with the end face 49 of the main part. The thickness 61 of the protruding section 33 may be less than one third of a thickness 63 of the main part 35 of the thermal insulation layer 34. The thickness 61 of the protruding section 33 of the thermal insulation layer 34 is substantially uniform over its length 65.

The anti-corrosion coating layer 32 of the pipe sections extends beyond the protruding thermal insulation 33 over a length 52 and forms a protruding section 53 of the anti-corrosion coating layer 32. The distance 52 is at least twice as large as a thickness 102 of the anti-corrosion coating layer 32, and more in particular at least five times a thickness 102 of the anti-corrosion coating layer 32. The protruding section 53 of the anti-corrosion coating layer 32 has an end face 104. The end face 104 is non-aligned with the end face 50 of the protruding section 33 of the thermal insulation. The protruding section 53 has an outer surface 108 which extends parallel to the pipe wall.

The thickness 102 of the protruding section 53 of the anti-corrosion coating layer 32 is substantially uniform over its length 52.

The outer surface 108 of the protruding section 53 of the anti-corrosion coating layer 32 extends parallel to the outer surface 47 of the protruding section 33 of the thermal insulation layer 34.

The end zone 38 of the pipe section 22 is bare metal, as is the end zone 38 of the pipe section 24.

In the method of applying a Field Joint Coating according to the invention, an anti-corrosion layer 60 is applied on the bare metal of the area 40 around the field joint 20. The anti-corrosion layer 60 may be an epoxy such as a fusion bonded epoxy. The anti-corrosion layer 60 overlaps the protruding section 53 of the anti-corrosion layer 32 of the pipe section 22 in a region of overlap 106. Said region of overlap 106 extends parallel to the pipe wall. The region of overlap 106 extends over a length 52 which may be similar to the length 52 of the protruding section 53 of the anti-corrosion layer 32. In other words, the anti-corrosion layer 60 of the FJC overlaps the entire protruding section 53 of the anti-corrosion layer 32 of the pipe section 22. The anti-corrosion layer 60 bonds with the anti-corrosion layer 32 of the pipe section 22 at the protruding section 53 and forms a second seal 132. In the region of overlap 106, the anti-corrosion layer 60 of the FJC extends parallel to the pipe wall.

The anti-corrosion coating layer 60 may be applied by thermal spraying, i.e. by heating the material of the anti-corrosion layer and spraying fine droplets of said material onto the area 40. There are other methods of applying the anti-corrosion layer.

The anti-corrosion coating layer 60 may have a thickness of between 0.01 mm and 1 mm.

The anti-corrosion layer 32 of the pipe section and the anti-corrosion layer 60 of the field joint together form a closed anti-corrosion layer over the field joint.

An adhesion promoter may be applied over the anti-corrosion layer.

In a next step, an intermediate coating layer 62 of a polymer is applied onto the anti-corrosion layer 60, or adhesion promoter. Preferably, the intermediate coating layer 62 is thermally sprayed. The intermediate coating layer 62 is sprayed over at least a part of the end faces 50 of the thermal insulation 34 of the pipe section.

Preferably, the intermediate coating layer 62 is polypropylene, and the thermal insulation 34 of the pipe sections is also polypropylene.

The intermediate coating layer 62 bonds with the thermal insulation layer 34, i.e. the protruding section 33 thereof in the region of overlap 54 at the end face 50. In this way, a first seal 130 is formed in the region of overlap. The two seals 130 132 are named "first" seal 130 and "second" seal 132, because any water ingress coming from the outside will first meet the first seal 130 and subsequently meet the second seal 132. In the method of making the FJC, the first seal 130 is made after the second seal 132.

The intermediate coating layer 62 may also be applied over a part of or the whole of an outer side 47 (or outer surface) of the protruding section 33 and over a part or the whole of the end face 49 and may also bond to the thermal insulation layer in this region. Therefore, the region of overlap 54 may extend from a foot 69 of the end face 50 to a top 71 of end face 49.

The intermediate coating layer 62 may have a thickness of between 0.01 mm and 10 mm.

The intermediate coating layer is sprayed by thermal spraying, preferably before the anti-corrosion layer has fully cured.

Two continuous layers are hence provided, a first layer comprising the anti-corrosion coating layer 32 of the pipe section and the anti-corrosion layer 60 of the field joint, and a second closed layer comprising the intermediate coating layer 62 of the field joint and the thermal insulation 34 of the pipe section.

Figure 4:
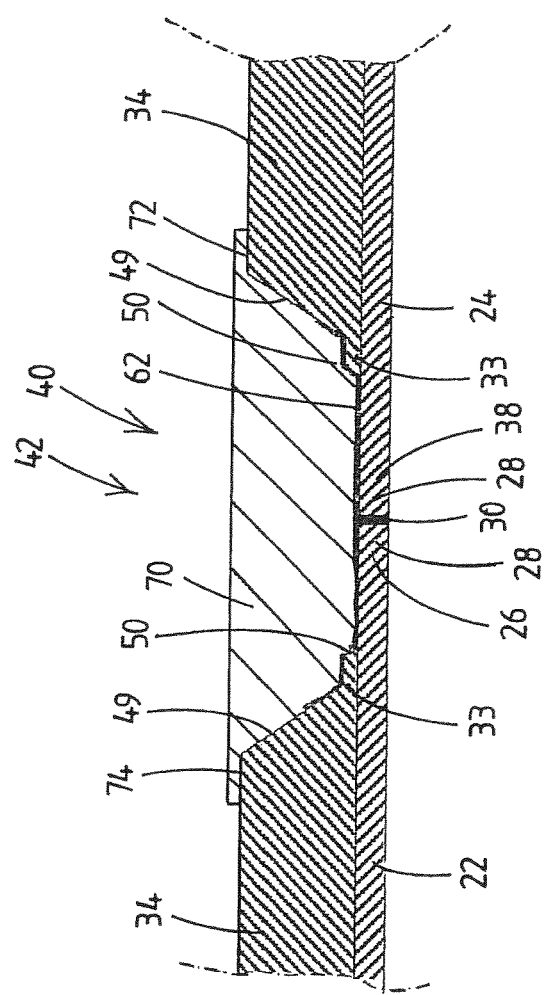
FIG. 4 shows a sectional view of a Field Joint Coating across to two joined pipe sections.

Turning to FIG. 4, the intermediate coating layer 62 may subsequently be treated for bonding with the thermal insulation layer 70 of the Field Joint Coating 42. The treating step may comprise applying a primer and or surface treatment, for instance roughening the surface of the intermediate coating layer 62.

In a next step, the thermal insulation layer 70 of the field joint coating 42 is applied.

Due to the size of FIG. 4, the anti-corrosion layers 32, 60 are not separately shown, but the skilled person will understand that these layers are present nonetheless.

The thermal insulation layer 70 may be composed of polyDiCycloPentaDiene (pDCPD), and/or silicone, and/or a modified polyether. Preferably the thermal insulation layer 70 is fast-curing.

The thermal insulation material polyDiCycloPentaDiene has a short gel time of about 20-25 seconds for FJC. This means that the field joint can be launched into the sea very soon after the coating has been applied. This allows a faster pipeline laying process.

During research, the thermal insulation material polyDiCycloPentaDiene was further found to show a very good adhesion to PP, with adhesion tensions being in the order of 12 Mpa.

The thermal insulation layer 70 may be applied by injection moulding, a process which is known in the field of the art. The thermal insulation layer 70 covers the intermediate coating layer and fills the space between the end faces 49, 50 on either side of the field joint 20. The thermal insulation layer 70 may cover the end sections 72 of the thermal insulation layers 34 of the pipe sections 22, 24 over a certain distance 74.

The Field Joint Coating 42 is now finished, and the field joint may be lowered into the water from the pipeline laying vessel.

The Field Joint Coating 42 has an advantage of both good thermal insulation and low water ingress. Turning to FIG. 3C, the group of layers 32, 34 forming the coating 25 of the pipe section on the one hand and the group of layers 60, 62, 70 forming the FJC on the other hand define an interface 120. The interface 120 is indicated with a thick dashed line, The interface 120 defines the path along which water should travel in order to reach the pipe 22 and corrode the pipe. It will be understood that the interface 120 is actually a surface which extends about the pipe 22, and that on the opposite side of the weld a same interface 120 is present at the transition of the FJC and the coating 25 of pipe 24.

The interface 120 has a total length 126 from the outside 122 to the position where the interface 120 reaches the pipe 22. The length 126 of the interface 120 is greater than twice the thickness 63 of the thermal insulation layer 34. The length 126 of the interface 120 is substantially greater than a corresponding length of an interface of the system of WO2010/009559, see FIG. 10. When travelling from the outside 122 to the point 124 where the transition reaches the pipe, the interface 120 comprises two regions of overlap:

- a first region of overlap 54 defining a first seal 130 between the intermediate coating layer 60 of the FJC and the thermal insulation layer 34 of the pipe 22 section, and
- a second region of overlap 106 defining a second seal 132 between the anti-corrosion layer 60 of the FJC and the protruding section 53 of the anticorrosion layer 32 of the pipe 22.

Both regions of overlap 54, 106 i.e. both seals 130, 132 are relatively long and have a good bonding between respectively the intermediate coating layer 60 of the FJC and the thermal insulation layer 34 of the pipe 22 section, and between the anti-corrosion layer 60 of the FJC and the protruding section 53 of the anti-corrosion layer 32 of the pipe 22. Therefore, water ingress is prevented by the two subsequent seals 130 and 132. As a result, water ingress is more difficult than in the system of WO2010/009559. The present invention therefore provides a substantial improvement over WO2010/009559 in terms of prevention of water ingress.

Figure 5:
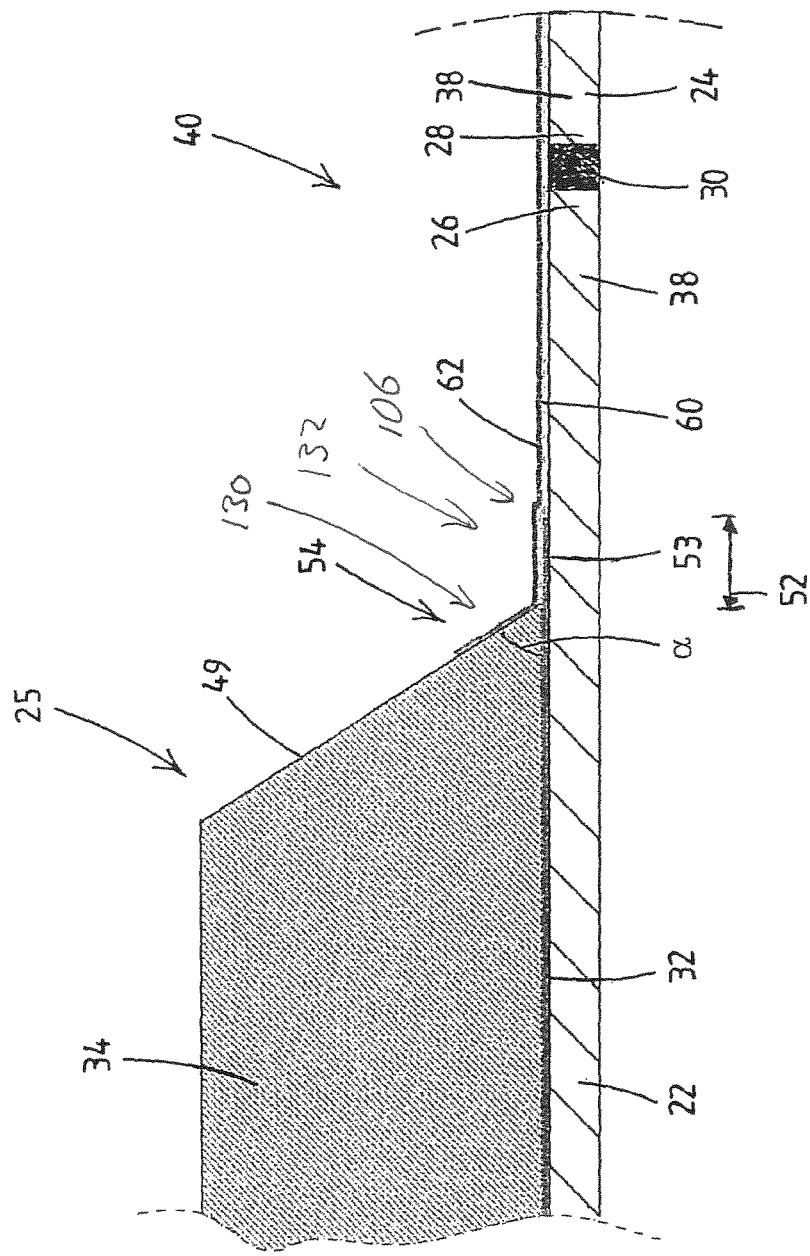
FIG. 5 shows a partial sectional view of an alternative embodiment.

Turning to FIG. 5, an alternative embodiment is provided wherein the protruding section 33 of the thermal insulation layer (34) is not present, and wherein the intermediate coating layer 62 covers the end face 49 directly. This embodiment also has a first seal 130 and a second single seal 132. The first seal 130 is formed by the intermediate coating layer 62 overlapping the end face 49 in the region of overlap 54, and the second seal 132 is formed by the anti-corrosion layer 60 of the FJC overlapping the anti-corrosion layer 32 of the pipe in the region of overlap 106. This embodiment is also a substantial improvement over WO2010/009559, because due to their length, the first seal 130 and second seal 132 have a higher water blocking capability than can be realized with the system of WO2010/009559.

It will be apparent to those skilled in the art that various modifications can be made to the pipeline unit, assembly and method without departing from the scope of the invention.

The invention claimed is:

1. A method of manufacturing a Field Joint Coating (FJC), the method comprising:
   providing a pipe section to be joined to a further pipe section, wherein each pipe section is provided with a coating comprising:
      a thermal insulation layer which extends over a substantial portion of the length of the pipe section, and
      an anti-corrosion layer situated underneath the thermal insulation layer, wherein end zones of the pipe section are free of coating,
   connecting the pipe section to the further pipe section to form a field joint,
   applying an anti-corrosion coating layer on a connection region of the joined ends of the pipe section and the further pipe section,
   heating at least a part of the thermal insulation layer of the pipe section and the further pipe section on either side of the field joint and applying an intermediate coating layer of a thermoplastic material over the anti-corrosion coating layer and over end faces of the thermal insulation layers on either side of the field joint to provide a continuous intermediate coating layer, wherein the continuous intermediate coating layer is applied over the anti-corrosion coating layer and over end faces of the thermal insulation layers of the joined pipe sections on either side of the field joint, and wherein the continuous intermediate coating layer is allowed to bond with the thermal insulation layers of the joined pipe sections on either side of the field joint, thereby providing a seal across the connection region, and
   applying a FJC thermal insulation layer on the continuous intermediate coating layer,
   wherein the thermal insulation layer comprises a protruding section which protrudes from a main part of the thermal insulation layer, wherein the protruding section of the thermal insulation layer has a thickness which is smaller than a thickness of the main part of the thermal insulation layer,
   wherein the protruding sections of the thermal insulation of the pipe sections comprise an outer side which extends substantially parallel to a pipe axis, and wherein the continuous intermediate coating layer is applied over at least a portion of the outer side of the protruding sections on either side of the field joint.

2. The method of claim 1, wherein the anti-corrosion layer of each pipe section comprises a protruding section which protrudes from underneath the thermal insulation layer over a length, and wherein applying the anti-corrosion coating layer of the FJC comprises applying a layer of an anti-corrosion coating material onto the connection region and the protruding section of the anti-corrosion layer.

3. The method of claim 2, wherein the anti-corrosion layer has a thickness, and wherein the protruding section of the anti-corrosion layer protrudes over a distance of at least twice said thickness from underneath the thermal insulation layer.

4. The method of claim 2, wherein the protruding section of the thermal insulation layer has a length which is more than twice a thickness of the protruding section of the thermal insulation layer.

5. The method of claim 4, wherein the protruding section of the anti-corrosion layer protrudes over a distance from underneath the protruding section of the thermal insulation layer, wherein the thickness of the protruding section of the thermal insulation layer is substantially uniform, wherein the thickness of the protruding section of the anti-corrosion layer is substantially uniform, and wherein the intermediate coating layer is applied over at least a portion of an end face of the protruding section of the thermal insulation layer.

6. The method of claim 4, wherein applying the intermediate coating layer comprises thermally spraying a layer of thermoplastic material onto the anti-corrosion layer and at least a part of the protruding section of the existing layer of thermal insulation, wherein the protruding section of the thermal insulation layer is heated prior to applying the intermediate coating layer, and wherein the intermediate coating layer is fused to the protruding sections of the thermal insulation layers of the pipe sections on either side of the field joint to form one continuous layer across the field joint.

7. The method of claim 1, wherein the further pipe section forms the free end of a pipeline.

* * * * *